(12) United States Patent
Sakai

(10) Patent No.: US 6,833,152 B2
(45) Date of Patent: Dec. 21, 2004

(54) SOYBEAN JAM

(75) Inventor: Ritsuko Sakai, Yokohama (JP)

(73) Assignee: Yugenkaisha Sakai, Yokohama (JP)

( * ) Notice: Subject to any disclaimer, the term of this patent is extended or adjusted under 35 U.S.C. 154(b) by 125 days.

(21) Appl. No.: 10/155,091

(22) Filed: May 24, 2002

(65) Prior Publication Data

US 2003/0082292 A1 May 1, 2003

(30) Foreign Application Priority Data

Oct. 31, 2001 (JP) .................................... P2001-344290

(51) Int. Cl.[7] .............................. A23L 1/20; A23L 1/06
(52) U.S. Cl. ...................................... 426/634; 426/573
(58) Field of Search ................................ 426/634, 573

(56) References Cited

U.S. PATENT DOCUMENTS

| | | | | |
|---|---|---|---|---|
| 5,866,192 A | * | 2/1999 | Uesugi et al. | 426/634 |
| 2003/0152684 A1 | * | 8/2003 | Saito et al. | 426/548 |

FOREIGN PATENT DOCUMENTS

| | | | |
|---|---|---|---|
| JP | 51-79760 | | 7/1976 |
| JP | 56-11767 | * | 2/1981 |
| JP | 57-5655 | * | 1/1982 |
| JP | 57-005655 | | 1/1982 |
| JP | 58-162242 | * | 9/1983 |
| JP | 59-175850 | * | 10/1984 |
| JP | 62-138161 | * | 6/1987 |
| JP | 63-126461 | * | 5/1988 |
| JP | 05-304922 | * | 11/1993 |
| JP | 09-56356 | * | 3/1997 |

OTHER PUBLICATIONS

"Zunda–mochi", Asahi Shinbun, No. 913, Jul. 31, 1997.

* cited by examiner

Primary Examiner—Anthony Weier
(74) Attorney, Agent, or Firm—Norris McLaughlin & Marcus PA

(57) ABSTRACT

The present invention provides a soybean jam that can increase the opportunities for consuming soybean, which is known as a health food, particularly in a Western style diet with few chances to eat them. The present invention also provides a method for manufacturing the soybean jam including the steps of manufacturing a soybean paste by grinding and kneading soybean grains after boiling, and forming a jam by mixing the soybean paste with other ingredients of the jam including pectin, sugar and organic acids followed by boiling down the mixture. The soybean jam obtains a large proportion of the soybean component.

11 Claims, 1 Drawing Sheet

SOYBEAN JAM

BACKGROUND OF THE INVENTION

1. Field of the Invention

The present invention relates to a method for improving the opportunities for eating soybean by providing soybean, which is known as a health food, in a novel edible form, such as a jam, thereby enabling an increase in the consumption of soybean, even in a Western style diet, such as the United States, where current soybean intake is relatively low.

2. Description of the Related Art

Soybean has become known as a health food in recent years. While soybean is known as an excellent protein source abundant in edible fibers, oligosaccharides, potassium, calcium, magnesium, phosphor and iron, the opportunities for eating soybean have decreased with the change of lifestyle in Japan. Although processed soybean products such as fermented soybeans (natto), soybean curd (tofu) and soybean paste (miso) have been used as foodstuffs suitable for Japanese style diet and have become known abroad, especially in the United States, as health foods, they are generally not a familiar part of a Western style diet, and there are few opportunities to eat soybean. When soybean is supplied in a novel food form, it will be expected that more soybean is consumed in the Japanese style diet as well as in the Western style diet, in addition to consuming as the foodstuffs in traditional forms, such as fermented soybeans and soybean curd.

SUMMARY OF THE INVENTION

Accordingly, it is an object of the present invention is to increase the opportunities to eat soybean, and to provide soybean foods suitable for the Western style diet, such as the United States, where current soybean consumption is low.

The present invention for attaining the forgoing objects provides a soybean jam using a soybean paste prepared by grinding and kneading to a paste after boiling soybean grains, wherein this soybean paste is mixed with other ingredients of the jam including pectin, sugar and organic acids, followed by boiling down the mixture.

Another object of the present invention is to provide a method for manufacturing a soybean jam comprising the steps of manufacturing a soybean paste by grinding and kneading soybean grains after boiling, and forming a jam by mixing the soybean paste with other ingredients of the jam including pectin, sugar and organic acids, followed by boiling down the mixture.

Granular pieces of the soybean grains prepared by crushing the soybean grains may be added to the soybean paste.

Preferably, granular pieces of crushed grape or raisin are added to the soybean paste.

A flavoring material such as a liquor or lemon jounce may be added to the soybean paste.

It is desirable to remove the epidermis of boiled soybean in advance of crushing the soybean grains after boiling.

Raisin, grape, strawberry or orange may be used as an ingredient of the jam.

Preferably, sugar is supplemented with raw sugar, honey or syrup when a fruit deficient in sugar is used as the ingredient of the jam.

Preferably, organic acid components are supplemented with a sour fruit juice such as a lemon juice when a fruit deficient in organic acids is used as the ingredient of the jam.

Soybean as used in the present invention includes green soybean, namely immature soybean, in addition to mature soybean. Accordingly, the soybean jam and soybean paste may be manufactured using green soybean grains in place of the mature soybean grains.

DESCRIPTION OF THE PREFERRED EMBODIMENTS

Figure 1:
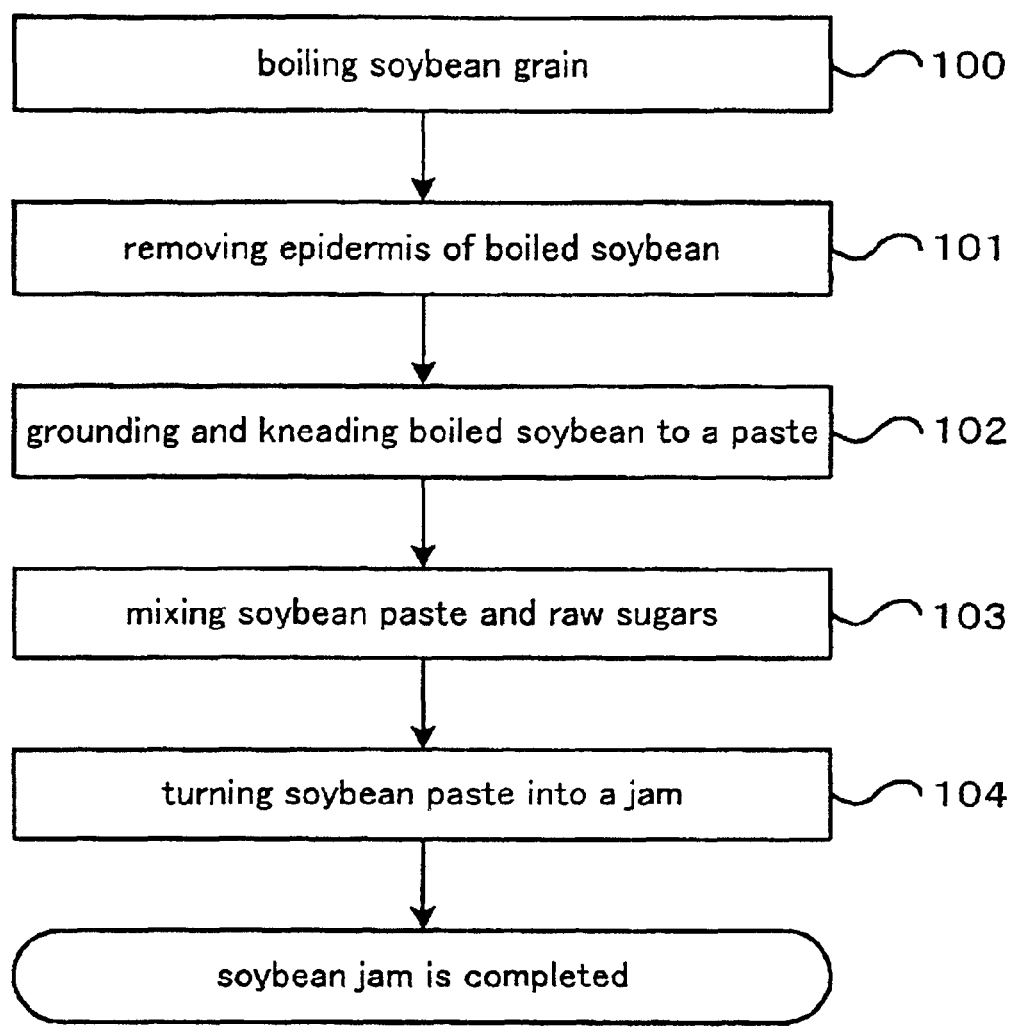
FIG. 1 illustrates an example of the method for manufacturing the soybean jam according to the present invention.

An example of the method for manufacturing the soybean jam according to the present invention, and an example of the method for manufacturing the soybean paste used as an ingredient of the soybean jam will be described in detail with reference to FIG. 1.

The soybean jam can be manufactured by mixing a soybean paste and an ingredient of the jam containing pectin, sugars and organic acids and by boiling down the mixture.

The soybean paste can be manufactured by grinding soybean after boiling the soybean grains, followed by thoroughly kneading to form a paste. The epidermis of boiled soybean is preferably removed before grinding.

At least the three components pectin, sugars and organic acids should be contained in a given proportion as ingredients of the jam, because the jam is only formed by an interaction among pectin, sugars and organic acids.

Accordingly, it is possible to use raw materials containing the three components of pectin, sugars and organic acids, such as raisin, grape and orange, as the ingredients of the soybean jam according to the present invention.

A standard proportion among pectin, sugars and organic acids necessary for forming the jam containing the ingredient as described above is 1.0 to 1.5% by weight of pectin, 65 to 70% by weight of sugars and 0.4 to 0.45% by weight of organic acids, relative to the total weight of all ingredients of the jam. Any starting material containing pectin, sugars and organic acids in this proportion can be formed into the jam by boiling.

Since a fruit that is used as an ingredient of the jam contains all of the three components (pectin, sugars and organic acids), the soybean jam can be basically manufactured using only the fruit and soybean paste. However, when a fruit relatively deficient in sugars as compared with the standard proportion of pectin, sugars and organic acids as described above is used, sugars may be supplemented with raw sugar, honey or syrup. When the fruit is deficient in organic acids, they may be supplemented with a sour fruit juice such as a lemon juice. Lemon also serves for adding flavor in the soybean jam. Liquors may be used for adding flavor to the soybean jam.

The method for manufacturing the soybean jam will be described hereinafter with reference to FIG. 1.

The soybean grains are boiled at first (step 100). Then, the epidermis of boiled soybean is removed (step 101). Subsequently, boiled soybean is ground and thoroughly kneaded to a paste, preferably with a pestle and mortar, thereby obtaining a paste of soybean required for manufacturing the soybean jam (step 102).

After obtaining the soybean paste by the steps 100 to 102, raw sugars or honey is mixed with the soybean paste as a sugar component. The proportion of mixing of the soybean paste and sugars such as raw sugar is 1: about 0.2. A liquor or lemon juice may be added as a flavoring material into the soybean paste (step 103).

A syrup and fruit juice is further added in the soybean paste together with sugars such as raw sugars, and the mixture is boiled. Then, the soybean paste turns into a jam by an interaction among the pectin component and organic acids in the fruit, sugars in the fruit, sugars in raw sugar, and honey and syrup in the soybean paste, thereby completing the soybean jam (step 104).

The fruit to be added to the soybean paste in the step 104 may comprise, for example, finely crushed pieces of raisin or grape.

While all the boiled soybean is made to be a paste in the step 102, a part of the boiled soybean may be crushed as granules to mix with the soybean paste.

The soybean jam manufactured as described above may be directly eaten. However, it is usually eaten by spreading on a slice of bread as a strawberry jam is. The soybean paste used for manufacturing the soybean jam may be also used for base materials of various dishes, and use of the soybean paste is not restricted to manufacture of the soybean jam. Further, the soybean jam may be added to peanut paste, which is common and widely consumed in countries outside of Japan, especially in the United States.

While manufacturing of the soybean paste and soybean jam using matured soybean grains has been described in the example, the soybean paste and soybean jam may be manufactured by the same manufacturing method as described above using green, immature soybean in place of matured soybean.

A jam containing a large proportion of the soybean component can be obtained in the present invention. Since it is made possible to eat soybean in a novel form such as soybean jam, the ability to eat soybean in the daily diet increases by making soybean to be a more familiar health food. Since the jam is eaten together with bread, more soybean may be consumed in a Western style diet, where presently soybean is seldom eaten.

What is claimed is:

1. A method for manufacturing a food formed from soybean paste comprising the steps of, in order:
   (1) boiling soybean grains;
   (2) manufacturing a soybean paste by grinding and kneading soybean grains;
   (3) forming the food by mixing the soybean paste with ingredients which contain pectin, sugars and organic acids; and
   (4) boiling down the mixture.

2. The method for manufacturing the food formed from soybean paste according to claim 1, further comprising, prior to step (3)
   crushing soybean grains to form granular pieces; and
   adding said granular pieces to the soybean paste.

3. The method for manufacturing food formed from soybean paste according to claim 1, wherein, prior to step (3), granular pieces of crushed grape or raisin are added to the soybean paste.

4. The method for manufacturing the food formed from soybean paste according to claim 1, wherein, prior to step (3), a flavoring material is added to the soybean paste.

5. The method for manufacturing the food formed from soybean paste according to claim 2, further comprising the step of, prior to the crushing step, removing epidermis of the boiled soybean.

6. The method for manufacturing the food formed from soybean paste according to claim 1, wherein the ingredients are chosen from the group consisting of raisin, grape, strawberry and orange.

7. The method for manufacturing the food formed from soybean paste according to claim 1, wherein the ingredients further comprise one or more chosen from the group consisting of raw sugar, honey and syrup.

8. The method for manufacturing the food formed from soybean paste according to claim 1, wherein the ingredients further comprise a sour fruit juice.

9. The method for manufacturing the food formed from soybean paste according to claim 1, wherein said soybean comprises green, immature soybean.

10. The method of claim 8, wherein the sour fruit juice is lemon juice.

11. The method for manufacturing a food formed from soybean paste according to claim 4, wherein the flavoring material is a liquor or lemon juice.

* * * * *